Feb. 2, 1971 G. L. WATSON ET AL 3,560,096
VENEER CLIPPER CONTROL SYSTEM
Filed Dec. 7, 1967 5 Sheets-Sheet 1
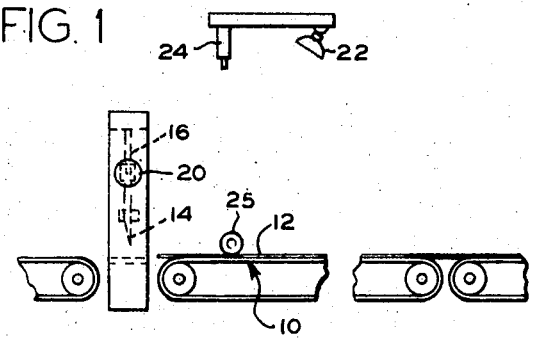
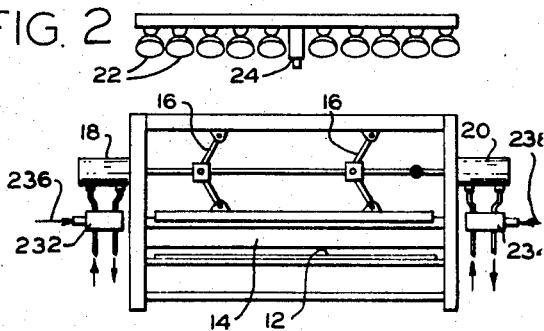
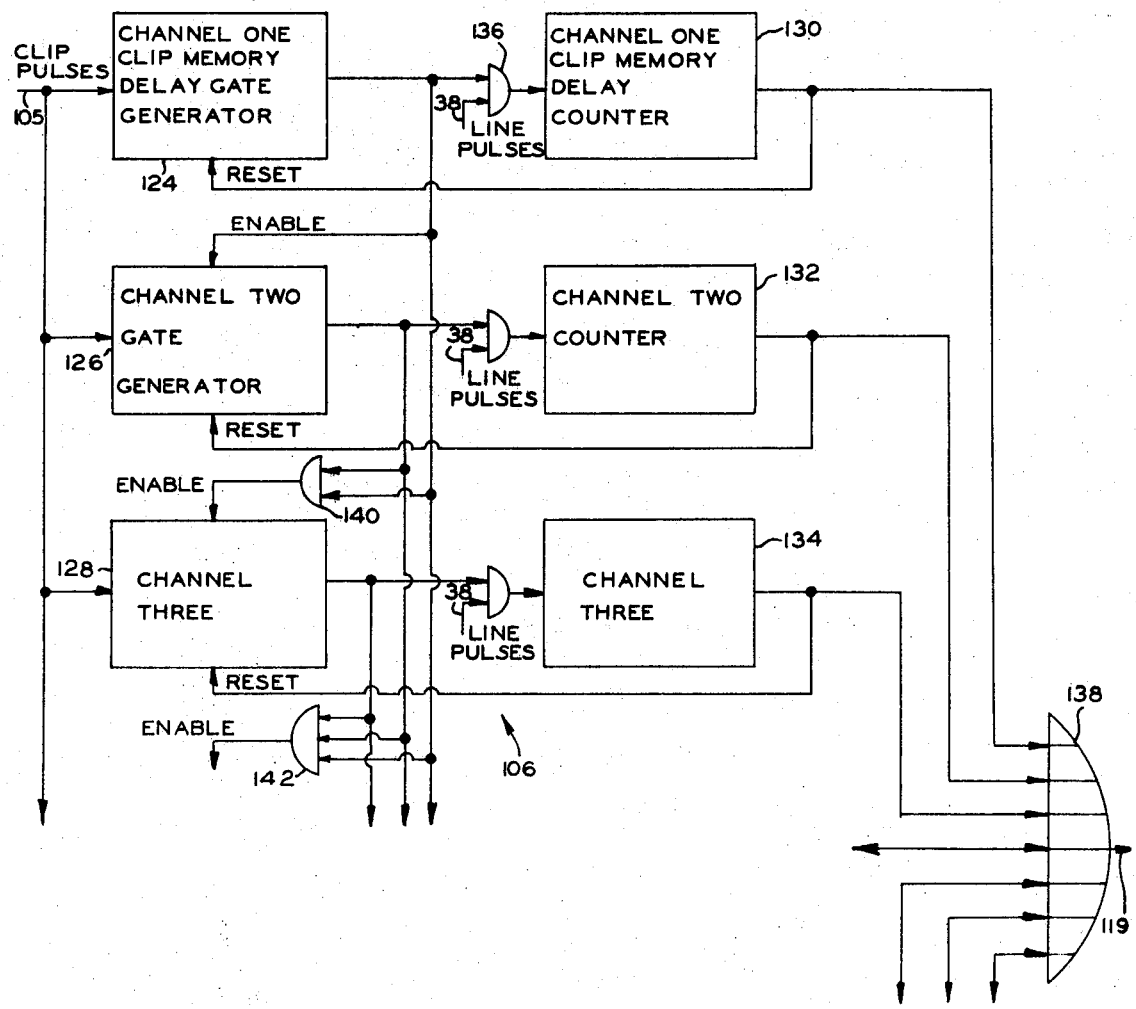
GERALD L. WATSON
LLOYD R. BRISTOL
INVENTORS
BY
BUCKHORN, BLORE, KLARQUIST & SPARKMAN
ATTORNEYS

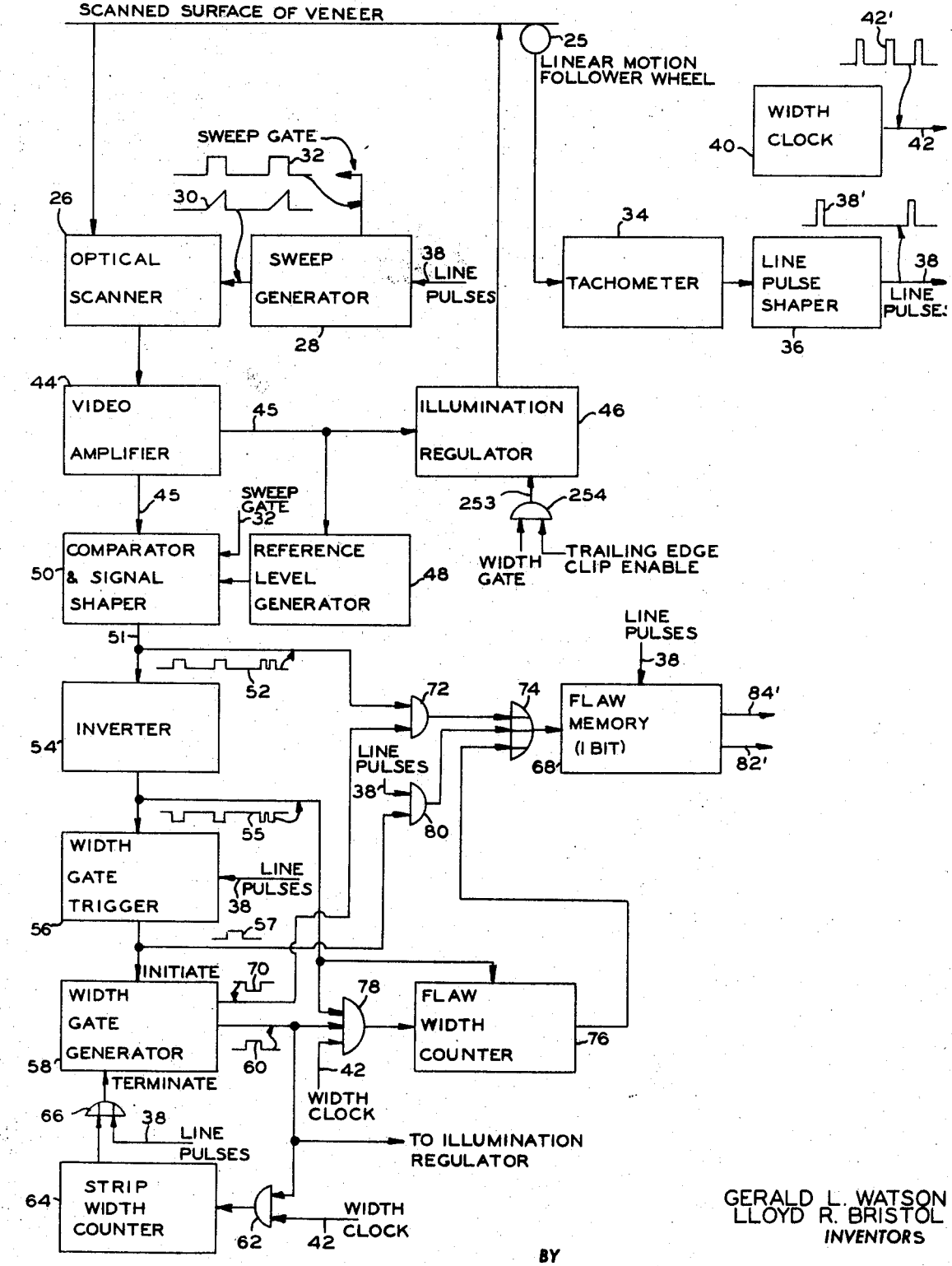

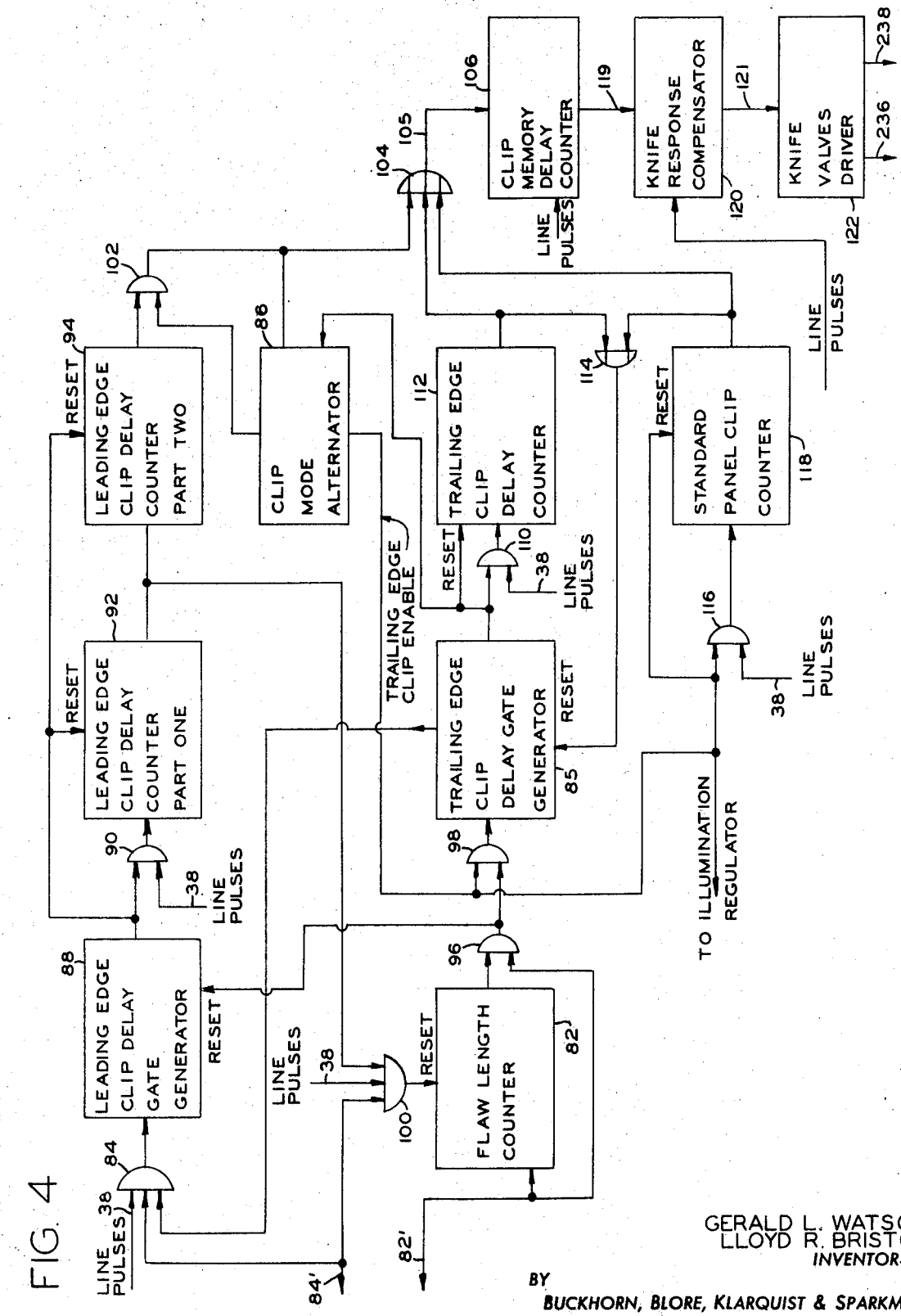

GERALD L. WATSON
LLOYD R. BRISTOL
INVENTORS

BY
BUCKHORN, BLORE, KLARQUIST & SPARKMAN
ATTORNEYS

GERALD L. WATSON
LLOYD R. BRISTOL
INVENTORS

BY
BUCKHORN, BLORE, KLARQUIST & SPARKMAN
ATTORNEYS 3,560,096
VENEER CLIPPER CONTROL SYSTEM
Gerald L. Watson, Portland, and Lloyd R. Bristol, Beaverton, Oreg., assignors to Morvue, Inc., Tigard, Oreg., a corporation of Oregon
Filed Dec. 7, 1967, Ser. No. 688,954
Int. Cl. G01b 11/00; G01n 21/16
U.S. Cl. 356—156                                  7 Claims

ABSTRACT OF THE DISCLOSURE

A television camera tube optically scans evenly spaced lines across a longitudinally moving strip of veneer in response to line pulses derived from a tachometer synchronized with the movement of the strip and under automatically controlled strip illumination conditions. Strip width and flaw width counters of clock pulses controlled by the output of the camera tube cause the production of a flaw pulse, if along any line scan the width of good wood is incorrect or at least one flaw of excessive width is present. A flaw length counter of flaw pulses in conjunction with a line pulse counter determine what portions of the strip are unacceptable and in conjunction with delaying counters of line pulses cause actuation of the knife to cut unacceptable portions from the strip and to cut panels from acceptable portions of predetermined minimum width and also standard maximum width. A knife response compensator compensates for errors due to changes in rate of movement of the strip and for knife position when the knife has not had time to return to rest position from a previous clip.

BACKGROUND OF INVENTION

The invention relates to a system for the accurate automatic control of a veneer clipper knife employed to make leading edge clips and trailing edge clips to cut unacceptable portions from acceptable portions of a moving strip of veneer which has been peeled from a log in a veneer lathe. Thus imperfect leading edge portions which have an incorrect or unacceptable width of light colored good wood usually edged by dark portion must be clipped from the advancing end of the strip by leading edge clips. Similar leading edge clips should be made immediately after any dark colored flaw of unacceptable area either in the central portion or along an edge of the strip. Also trailing edge clips should be made immediately in advance of any such flaws including any trailing portion of the strip having an unacceptable width of good wood. These clips between unacceptable and acceptable portions of the strip should be made in acceptable portions of the strip as close as practicable to any flaw in the unacceptable portion of the strip in order to recover the maximum amount of good wood. Also any panels of good wood which are cut should have an acceptable minimum width and long lengths of acceptable veneer should be accurately cut into panels of standard width.

Various types of control systems relying upon photoelectric or other optical means of sensing flaws in conjunction with electrical relay circuits for controlling the actuation of the clipper knife have been proposed. Such systems have not proved sufficiently accurate or reliable. A system in common use at the present time requires an operator to watch the moving strip as it passes under a shadow line projected on the strip and to press a button or actuate a small lever when in his opinion a clip should be made in the portion of the clip then crossing the shadow line.

A mechanical memory is sometimes employed. This may take the form of a chain moving at the same speed as the strip and having knife actuation initiating elements displaceable thereon as a result of the operators manual actuation of the button or lever referred to above. Such elements cause actuation of the knife after a delay proportional to the movement of the strip following such manual actuation. This manually controlled system requires close attention of the operator with resultant fatigue and the accuracy depends not only upon the normal skill of the operator but also upon his fatigue. Also the speed of the strip being fed to the knife usually varies widely such that the time delay which occurs between the time the cutting action of the knife is initiated and the cut is actually made results in uncompensated errors in the position of the cut along the strip.

SUMMARY OF THE INVENTION

The system disclosed in the present application employs optical line scanning of the veneer strip in conjunction with clock pulse and line pulse counting operations to more accurately and more consistently determine the optimum positions along the veneer strip for the various clips referred to above than prior systems including those in which an operator determines the position of the clips along the strip. A knife response compensator reduces errors in the positions of the clip due to variations in the rate of movement of the strip and the position of the knife as a result of a previous clip but even in the absence of such compensator, the system of the present application results in a material saving of good wood and resultant increases in the total area of acceptable veneer panels produced. The knife response compensator thus provides increased accuracy and an additional increase in production. The same is true of a strip illumination control and a reference level generator both responsive to the output of the optical scanner and both assisting in more accurately determining the optimum position of the clips.

BRIEF DESCRIPTION OF THE DRAWINGS

FIG. 1 is a diagrammatic sketch showing a side elevation the relative position of a veneer clipper knife and illuminating and scanning elements in a system in accordance with the present invention;

FIG. 2 is a view similar to FIG. 1 showing the elements of FIG. 1 in front elevation;

FIG. 3 is a block diagram of the flaw detecting portion of a system in accordance with the present invention;

FIG. 4 is a block diagram similar to FIG. 3 of the knife control portion of the system;

FIG. 6 is a block diagram illustrating the circuitry of the clip memory delay counter block of FIG. 4.

DESCRIPTION OF THE PREFERRED EMBODIMENT

Figure 5:
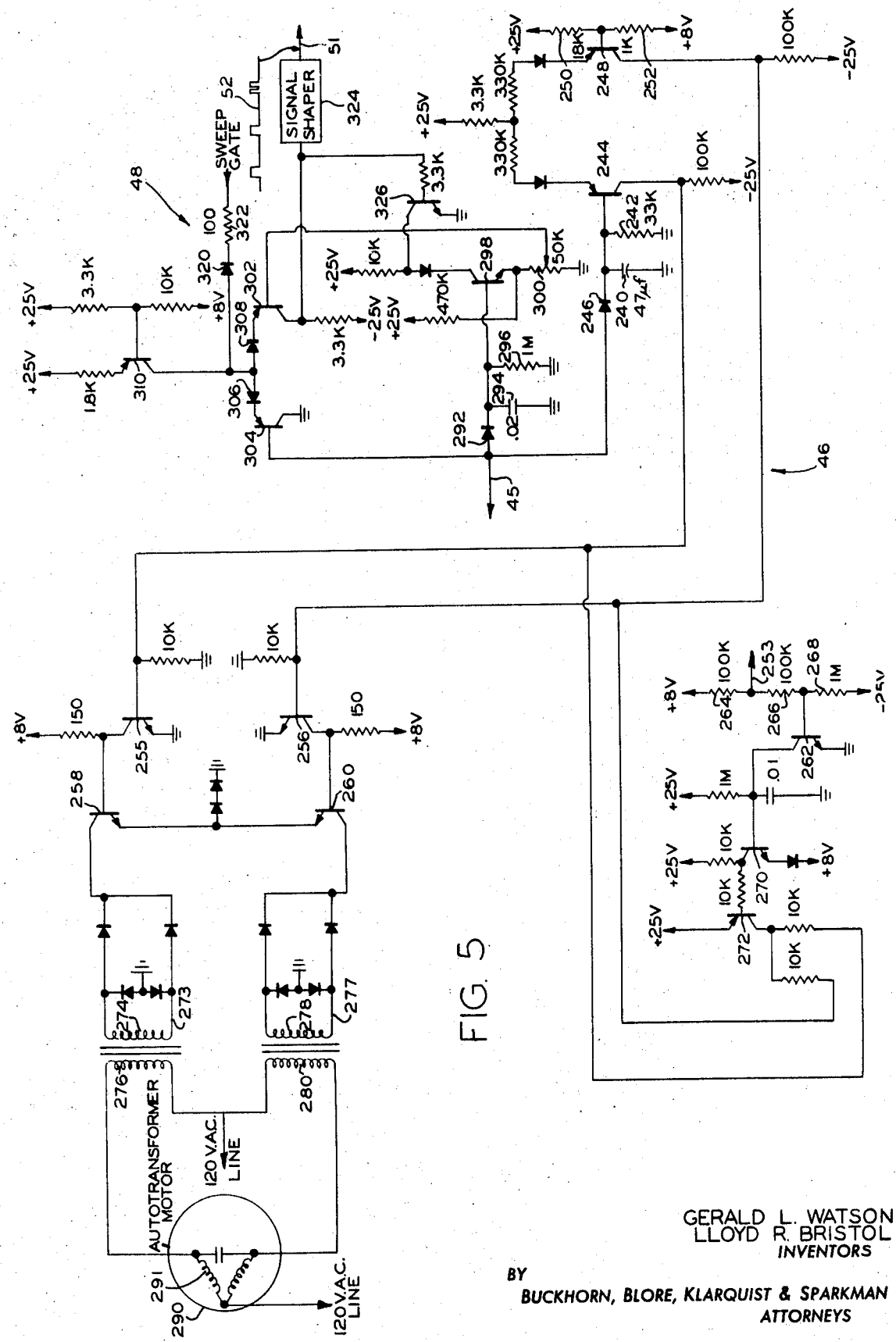
FIG. 5 is a schematic diagram of the circuits of the ilumination regulator and the reference level generator and comparator blocks of FIG. 3.

FIGS. 1 and 2 show diagrammatically a conventional veneer clipping apparatus including a belt conveyor 10 for delivering a strip of veneer wood 12 from a veneer lathe to a clipping knife 14 suspended on toggles 16 connected to the piston rods of double acting pistons in compressed air cylinders 18 and 20. The strip 12 as it approaches the knife 14 is illuminated by an overhead row of incandescent lights 22 and is scanned by a television camera tube 24. A follower wheel 25 driven in synchronism with the strip, or if the strip is not present by the conveyor belt 10, is illustrated diagrammatically and as described below drives a tachometer which, in conjunction with a pulse shaper, provides an output of pulses, each corresponding to a predetermined increment of longitudinal movement of the strip toward the knife. Each of the pulses triggers a scan of a line across the strip by the camera tube 24 and these tachometer or increment of movement pulses will be referred to herein as line pulses. The scanning rate or speed of the scan across the strip will always be very much greater than the rate of movement of the strip so that the scanned lines will be substantially parallel even if the speed of the strip varies widely.

The camera tube is preferably of the image dissector type but any other type of camera tube which can be employed to repeatedly scan a single line in the same relative position in the camera without damage to the tube can be employed.

The background provided for the strip of the veneer is substantially uniformly dark so that light colored good wood will produce a distinctly different camera tube video output voltage level than the dark colored background or the dark colored portions which may be present on the trailing and leading ends and side edges of such strip or which may be present between the margins of good wood.

The optical scanner block 26 of FIG. 3 includes the camera tabe and conventional power sources and control circuits for such tube. A separate block 28 is shown for the sweep generator circuit which may be of any conventional type, such as a Miller integrator, controlled by a bistable multivibrator and trigger circuit and providing, in addition to a sweep waveform 30 supplied to the scanner 26, a sweep gate output 32 at one voltage level between scans and at another level during such scans.

A tachometer 34 driven by the follower wheel 25 is employed in conjunction with a line pulse shaper 36 to provide an output 38 of line pulses 38'. The output of the tachometer is shaped by the pulse shaper 36 to produce narrow rectangular line pulses. Each pulse represents an increment of movement of travel of the veneer strip, for example $\frac{1}{10}$-inch. The sweep generator 28 is triggered by each of the line pulses 38' to produce a ramp sweep waveform and the line pulses are also employed in other circuits described below.

A width clock 40 is also provided and produces an output 42 of rapidly repeated clock pulses 42' which are uniformly spaced in time. These pulses are employed in the circuits described below to measure the width of good wood and of flaws in the veneer strip being scanned.

The output of the optical scanner is delivered to a video amplifier 44 which may be any known or suitable linear amplifier. The output 45 of such amplifier is delivered to an illumination regulator 46. As described below, the illumination regulator is rendered operative whenever light colored good wood is being scanned and such regulator varies the electric power delivered to the lamps 22 of FIGS. 1 and 2 to compensate for changes in ambient illumination and reflectivity of the good wood so as to maintain the amount of light reflected from good wood substantially constant.

The output 45 from the video amplifier 44 is also delivered to a reference level generator circuit 48 which derives a reference voltage from the maximum output level of the video amplifier during scanning of the strip and delivers such voltage to a comparator and signal shaper 50 to which the output 45 of the video amplifier 44 is also delivered.

The comparator and signal shaper 50 compares the video output from the amplifier 44 with the reference level from the reference level from the reference level generator 48 and delivers through the ouput 51 a rectangular wave of constant amplitude and at one voltage level when the output of the video amplifier exceeds the reference level from the reference level generator 48 and at another voltage level when the video output is less than the reference level. Such an output waveform is shown at 52 and in the example given the waveform is at its more positive level when good wood is being scanned.

The output waveform 52 is delivered to an inverter 54 which inverts such waveform 52 to produce the waveform 55 and delivers it to a width gate trigger 56. The width gate trigger contains a bistable multivibrator which is changed from a first stable state to a second stable state by each line pulse 38' from the output 38 of the line pulse shaper 36. This conditions the width gate trigger 56 for a triggering operation which occurs whenever the output from the video amplifier 44 exceeds the reference level from the reference level generator. Thus the inverted waveform 55 causes the multivibrator of the width gate trigger to revert to its first state.

The output from the width gate trigger is a rectangular waveform 57 having two voltage levels and the change in voltage resulting from such reversion of the multivibrator is utilized in a width gate generator 58 to trigger such generator. The width gate generator also contains a bistable multivibrator which is caused to change from a first stable state to a second stable state when it is triggered by such change in voltage from width gate trigger 56 to thus provide a width gate waveform 60 which is at one voltage level when the width gate generator is in its first stable state and at another voltage level when it is in its second stable state.

The width gate waveform 60 is delivered to an *and* gate 62 to which the clock pulses 42' are also delivered from the output 42 of the width clock 40, with the result that the *and* gate 62 passes the clock pulses to the strip width counter 64 only when the width gate generator has been triggered and is in its second stable state.

The strip width counter 64 counts the rapidly occurring clock pulses 42' and at the termination of a desired count corresponding to the desired width of the good wood of the strip, the counter 64 sends a pulse through the *or* gate 66 to the width gate generator to cause such generator to return to its first stable state and terminate the width gate and thereby terminate the count by the strip width counter.

Each width clock pulse 42' represents an increment of distance across the strip being scanned, for example, approximately $\frac{1}{10}$ of an inch. Depending upon the desired width of the veneer strips being scanned, the strip width counter may, for example, be set for counts of 384, 512 or 640, before the termination of the width gate. Such counts are employed for determining whether the width of good wood in the strip being scanned is within the limits required for acceptable veneer panels and, if not, a flaw indication signal is sent to and stored in a flaw memory 68 for each line scan in which this type of flaws is detected. The flaw memory includes a bistable multi-vibrator which is changed from a first stable state to a second stable state by the flaw indication signal so as to store this signal.

Too great a width of good wood which persists during a predetermined length of strip is considered a flaw as well as too narrow a width of good wood. In order to produce a flaw indication when too great a width of good wood is present during a line scan, an inverted width gate signal 70 is supplied to an *and* gate 72 as is also the output waveform 52 from the comparator and signal shaper 50. If the optical scanner 26 is still scanning good wood when the count of the strip width counter 64 causes the width gate generator 58 to revert to its first stable state, a flaw indication signal passes through the *and* gate 72 and an *or* gate 74 to the flaw memory 68. It is to be noted that this flaw indication signal is produced by too great a width of good wood irrespective of the lateral position of the strip on the conveyor belt 10 delivering the strip to the knife 14, since the strip width counter begins its count only when good wood is first encountered and the count continues for a number of counts corresponding to the maximum desired width of good wood of the strip. The production of other flaw indication signal discussed below is also independent of the lateral position of the strip on the conveyor belt.

A flaw indication signal is also stored in the flaw memory 68, if a flaw of at least a predetermined width is present within the marginal edges of the good wood scanned by any given line. A flaw width counter 76 is employed to produce such signal. The inverted waveform 55 from the inverter 54 is delivered to *and* and gate 78 as is also the width gate waveform 60 and clock pulses 42' from the output 4 2of the width clock 40. Thus if the optical scanner 26 detects the absence of good wood, after good wood has first been encountered in a given scan and the width gate generator has not been terminated, the flaw width counter begins a count of clock pulse 42'. If the optical scanner 26 again encounters good wood, the change of voltage level of the inverted waveform from the comparator and signal shaper 50 is transmitted directly to the counter 76 to cause resetting of this counter. Unless a count of preselected minimum number is produced before such resetting, no output is produced by the flaw width counter 76. If, however, such counter succeeds in reaching a predetermined count, for example a count of 32 corresponding to approximately 3 inches of width of strip, a flaw indication signal is sent to the flaw memory 68 through the *or* gate 74 and is stored in the flaw memory.

Flaws extending into the good wood from either edge of the strip result in a width of good wood which is below the minimum acceptable width and this also results in a flaw indication signal being stored in the flaw memory. It will be apparent that a width of good wood in any given line scan which is too small, will cause the counter 76 to be started by the detection of the absence of good wood during the scan. Also this counter will reach its predetermined count during the time the width gate generator is in its second stable state and before the strip width counter 64 has finished its count. This is the same result produced by the presence of a flaw of at least minimum width within the lateral edges of good wood so that a flaw indication signal will also be sent to and stored in the flaw memory 68. Thus it makes no difference whether a flaw of at least as great as a predetermined width is at either edge of the good wood or within the lateral margins of the good wood. This predetermined flaw width is thus the difference between the minimum and maximum widths of good wood which are considered acceptable. It is apparent that a flaw indication signal is sent to the flaw memory whenever the good wood encountered in any given line scan is too great, too small, or there is a flaw between the lateral margins of the good wood exceeding a predetermined width, for example, the 3 inches referred to above.

The total absence of a veneer strip or the presence of a dark colored portion of the strip which extends entirely across the strip will also cause a flaw indication signal to be sent to the flaw memory 68. Since the width gate trigger 56 includes a bistable multivibrator, which is caused to change from a first stable state to a second stable state by a line pulse 38' delivered thereto from the output 38 of the line pulse shaper 36 and such multivibrator is reverted to its first stable state whenever good wood is encountered in the scan triggered by such line pulse, the absence of any good wood during such scan will leave the width gate trigger in its second stable state when the next line pulse is generated. The output 57 during such second stable state is applied to the *and* gate 80 so that the next line pulse is transmitted through the *and* gate 80 and the *or* gate 74 to the flaw memory 68 as a flaw indication signal.

Since storage of a flaw indicating signal in the flaw memory results from changing a bistable multivibrator from a first stable state to a second stable state, one flaw indication signal only can be stored in the flaw memory 68 for any one line scan. Thus the flaw memory must be reset by the next line pulse before another flaw indicating signal will have any effect.

Any time a flaw indication signal is stored in the flaw memory before or at the time a line pulse 38' is initiated by the tachometer 34 and line pulse shaper 36, the output 82' of the flaw memory delivers a flaw indication pulse to a flaw length counter 82 of the knife control portion of the system shown in FIG. 4, as the result of the production of such line pulse. That is to say, the line pulse 38' from the output 38 of the line clock interrogates the flaw memory 68 by resetting it, i.e. causing the multivibrator of such memory to change from its second stable state back to its first stable state where it remains until another flaw indication signal is stored therein as described above. This resetting is produced by the trailing edge of the line pulse, i.e. by the return of the voltage of the output 38 of the line pulse shaper 36 to its normal voltage level between line pulses 38'. It is however the leading edge of a line pulse from the *and* gate 80, delivered to the flaw memory 68 as a result of the absence of good wood in a line scan, which causes storing of a fault indication signal in the flaw memory 68. This enables the same line pulse to both store the fault indication signal from the *and* gate 80 in the flaw memory 68 by changing the bistable multivibrator of such memory from a first stable state to a second stable state and then interrogate the flaw memory by changing the multivibrator back to its first stable state, and it is the result of the latter change in state of the multivibrator which sends a flaw indication pulse from the output 82' of the flaw memory 68 to the flaw length counter 82.

When a flaw indication signal is stored in the flaw memory 68 so that the bistable multivibrator thereof is in its second stable state, a voltage transmitted to an *and* gate 84 shown in FIG. 4 through the output 84' from the flaw memory 68 prevents line pulses 38' from passing through the *and* gate 84. In the absence of the storage of a flaw indication signal in the flaw memory 68 and also in the absence of the generation of a trailing edge clip gating signal by a trailing edge clip delay gate generator 85 described below, the *and* gate 84 is conditioned by the voltage from the flaw memory 68 for passing such line pulses to a leading edge clip delay gate generator 88 containing a bistable multivibrator.

The trailing edge clip delay gate 85 is also controlled by a clip mode alternator 86 containing a bistable multivibrator which, as described below, is caused to change during the operation of the system, from a first stable state in which the clip mode alternator is in a leading edge clip mode to a second stable state in which the clip mode alternator is in a trailing edge clip mode. When the clip mode alternator 86 is in the leading edge mode the voltage supplied to the *and* gate 98 is such that pulses from the *and* gate 96 do not pass through the *and* gate 98 to the trailing clip edge delay gate generator 85. In the absence of such a pulse from the *and* gate 96 through the *and* gate 98, the trailing edge clip delay gate generator provides a voltage which is sent to the *and* gate 84 and in conjunction with the voltage from the flaw memory, if no flaw indicating signal is stored therein, enables line pulses to pass through the *and* gate 84 to the leading edge clip delay gate 88.

The arrival of a line pulse at the leading edge clip delay gate 88 under the conditions described causes the multivibrator of the leading edge clip delay gate generator 88 to change from a first stable state to a second stable state to deliver a gating voltage to another *and* gate 90 to which line pulses 38' from the output 38 of the line pulse shaper 36 are also delivered. When such gating voltage is delivered to the *and* gate 90, the line pulses pass through the gate 90 to a leading edge clip delay counter 92 which forms part of a complete leading edge clip delay counter also including another counter 94. As an example, the counter 92 may provide a count of 8 at the end of which it sends a pulse to the counter 94 which may, for example, also have a count of 8 such that the total count of the two counters in series is 64. Once the leading edge clip delay counter 92 starts operating because no flaw indication signal has been stored in the flaw memory 68, this counter counts line scans. The counter 92 is employed in conjunction with the flaw length counter 82 to determine whether a flaw of sufficient length longitudinally of the strip to render a portion of the strip unacceptable is present.

As described above, any time a flaw indicating signal is stored in the flaw memory 68, the next line pulse will cause a pulse to be sent to the flaw length counter 82. This counter has, for example, a count of 4 and any time this counter attains this count, a pulse is sent to an *and* gate 96 from the flaw length counter 82 and from the flaw memory 68 so as to send a pulse to the leading edge clip delay gate generator 88 to reset such generator. At this time the *and* gate 98 will not pass a pulse from the *and* gate 96 since the clip mode alternator is in the leading edge clip mode as described below.

As described above, the leading edge clip delay counter 92 will count line pulses 38′ corresponding to line scans and when the count of this counter reaches, for example, the count of 8 mentioned above, an output from the leading edge clip delay counter 92 will reset the flaw length counter 82, provided no flaw indicating signal is stored in the flaw memory 68. Both the leading edge clip delay counter 92 and the leading edge clip counter 94 are reset each time the leading edge clip delay gate generator 88 is reset. This means that any time 4 flaw indicating pulses are sent to the flaw length counter 82 before a group of 11 line scans has been completed, starting with the first line scan producing a flaw indication, the counters 92 and 94 are reset. No output pulse from the line counter 94 is produced if such resetting of the counters 92 and 94 occurs before the above referred to count of 64 is reached by the counters 92 and 94. Thus a count of 4 flaw indicating pulses by the flaw length counter 82 in a count of not more than 11 line scans is considered an unacceptable flaw. It is only after a count of 64 line scans have been attained by the counters 92 and 94 in the absence of unacceptable flaws, that an output pulse is delivered from the leading edge strip counter 94 to an *and* gate 102. Assuming that the clip mode alternator 86 is in the leading edge clip mode, which would be the case under the conditions just described, a voltage is delivered from the clip mode alternator to the *and* gate 102 which enables such gate to pass the clip pulse and this clip pulse is delivered through an *or* gate 104 and an output 105 from the *or* gate 104 to a clip memory delay counter 106 described below.

When the clip mode alternator is in the leading edge clip mode, no clip pulses are sent to the clip memory delay counter until there has ben a count of at least 64 line scans in which no unacceptable flaws have been detected. This enables a leading edge clip to be made only when a preselected minimum length of acceptable wood in the strip has been scanned. Thus a leading edge clip occurs only if a panel of good wood greater than a predetermined length of strip, for example, 3 inches, can be cut before an unacceptable flaw is encountered. The total delay in the systems is, however, such that the leading edge clip is made within an acceptable portion of the strip just after an unacceptable flaw has passed the knife 14.

A clip pulse from the counter 94 and the *and* gate 102 is also delivered to the clip mode alternator 86. This pulse causes the clip mode alternator to change from the leading edge mode to a trailing edge mode to thus cause the clip mode alternator to change the voltage level sent to the *and* gate 102 to thereby prevent passage of any clip pulses from the leading edge clip counter 94 through the *and* gate 102. At the same time a voltage level change is sent to the *and* gate 98 from the clip mode alternator 86 to condition such gate for the passage of a pulse from the *and* gate 96 whenever the flaw length counter 82 reaches a count of four.

When the clip mode alternator is in the trailing edge mode, the flaw length counter 82, the leading edge clip gate generator 88 and the leading edge clip delay counters 92 and 94 operate in the same manner discussed above when the clip mode generator 86 was in the leading edge clip mode except that no clip pulse from the counter 94 will pass through the *and* gate 102. Thus any time the flaw length counter succeeds in reaching the count of four within a group of line scans not exceeding 11, a pulse is sent through the *and* gate 96 to the *and* gate 98. This pulse passes through the *and* gate 98 to the trailing edge delay gate generator 85 and also is sent to the leading edge clip delay gate generator 88 to reset such generator and cause resetting of the counters 92 and 94. Trailing edge clip delay gate generator 85 contains a bistable multivibrator and such pulse from the flaw memory 68 by way of the *and* gate 96 and *and* gate 98 causes the multivibrator of the trailing edge clip delay gate generator to change from a first stable state to a second stable state and send a gate signal to *and* gate 110 which also receives line pulses 38′ from the output 38 of the line pulse shaper 36. This gate signal enables the line pulses 38′ to be delivered to a trailing edge clip delay counter 112 to start a count of line pulses therein. The trailing edge clip delay gate generator at this time also transmits a signal voltage level change to the *and* gate 84 which prevents any line pulse from passing through such gate to actuate the leading edge clip delay gate generator 88, thus disabling the leading edge clip delay counters 92 and 94 during the time that the counter 112 is conditioned to count line pulses.

When the trailing edge delay clip counter 112 reaches a predetermined count, for example, a count of 32, a clip pulse is sent to the *or* gate 104 and thus through the output 105 to the clip memory delay counter 106. This pulse is also sent to an *or* gate 114 and thence to the trailing edge clip delay gate generator 85 for resetting such generator. When this generator is reset, it sends a signal to the clip mode alternator 86 to convert the clip mode alternator back to its leading edge mode.

It will be apparent that a trailing edge clip will be made any time that an unacceptable flaw is detected by the scanning operation, whether such flaw is in an intermediate portion of the length of the strip or at the trailing edge of the strip. The count of the combined leading edge clip delay counters 92 and 94 is greater than that of the trailing edge clip delay counter 112. This difference in counts together with further delays later in the system are such that a leading edge clip is made just after an unacceptable flaw has passed under the clipping knife and a trailing edge clip is made just before an unacceptable flaw reaches the knife.

The change of the clip mode alternator to the trailing edge clip mode referred to above also transmits a change in voltage level to another *and* gate 116 which also receives line pulses 38′ through the output 38 of the line pulse shaper 36 so that such line pulses pass through such gate to a standard panel clip counter 118. If the standard panel clip counter 118 succeeds in reaching a predetermined count corresponding to the desired length along the strip of a standard panel before any unacceptable flaw determination, as described above, results in a count in the trailing edge clip delay counter 112 which produces an output pulse from that counter, the standard panel clip counter will itself produce a clip pulse which is sent through the *or* gate 104 and output 105 to the clip memory delay counter 106. This pulse is also sent through the *or* gate 114 to the trailing edge delay gate generator 85 to cause resetting of this gate generator and also the trailing edge clip delay counter.

The standard panel clip counter will repeatedly cause the cutting of standard panels from the strips when no unacceptable flaws are detected in the length along the strip of a standard panel. If such a flaw is detected, however, the trailing edge clip delay gate generator 85 and trailing edge clip delay counter 112 will produce a clip pulse and a change of the clip mode alternator 86 back to the leading edge mode. This resets the standard panel clip counter 118 so that it will be in condition to start a count whenever the clip mode alternator is again changed back to the trailing edge mode and an unacceptable flaw is detected.

The clip memory delay counter 106 is illustrated in FIG. 6 and includes a plurality of channels which receive the clip pulses from the *or* gate 104 through its output 105. After a time delay, each channel delivers a delayed clip pulse through an output 119 to a knife response compensator 120. This time delay is inversely proportional to the rate of movement of the strip and thus results in a constant distance along the strip for each pulse. The knife response compensator in turn delivers knife actuating pulses corresponding to each of the delayed clip pulses through an output 121 to a knife valves driver 122. Three clip memory delay counter channels are shown in FIG. 6, although in general, more channels will be provided, for example, seven channels will usually be enough for all possible conditions.

As illustrated diagrammatically in FIG. 6, the clip pulses from the output 105 of the *or* gate 104 of FIG. 4 are delivered to all of the clip memory delay gate generators 124, 126 and 128 of FIG. 6. These clip memory delay gate generators control the operation of clip memory delay counters 130, 132 and 134, respectively. Each of the clip memory delay gate generators contains a bistable multivibrator which is normally in a first stable state. When the clip memory delay gate 124 of channel one is in this state, such channel is clear and a clip pulse from the *or* gate 104 through its output 105 will actuate clip memory delay gate generator 124 of channel one to change its multivibrator from the first stable state to a second stable state. As long as the multivibrator is in the second stable state, arrival of subsequent clip pulses will have no effect thereon. Also the clip memory delay gate generators of the other channels are not actuated by such pulse as is described below.

The channel one clip memory delay gate generator 124 delivers a gating voltage to an *and* gate 136 to cause the channel one clip memory delay counter 130 to count line pulses 38' from the output 38 of the line pulse shaper of FIG. 3, which pulses are also delivered to the *and* gate 136. At the end of the predetermined count, for example, a count of 256 line pulses, a delayed clip pulse from such counter is sent to the *or* gate 138 and thence to the knife response compensator 120 through the output 119. The gate signal to the *and* gate 136 is also sent to the channel two clip memory delay gate generator 126 and conditions this generator for reception of the next clip pulse from the *or* gate 104 of FIG. 4 through its output 105. This gate signal is also sent to each of clip memory delay gate generators of all succeeding channels through *and* gates such as the *and* gates 140 and 142 of the next two channels, and in turn the signal from each subsequent memory delay gate generator is sent to the *and* gates for all of the subsequent channels. The result is that no clip memory delay gate of any channel except the first will be actuated by a pulse through the output 105 of the *or* gate 104 of FIG. 4 unless an *and* gate associated with such clip memory delay gate receives enabling gate voltages from the clip memory delay gates of all preceding channels.

The clip memory delay gate generators 124, 126 and 128, when actuated, each maintain their associated clip memory delay counter 130, 132 or 134 in operation until the count of such associated counter is completed. Thus each clip memory delay gate generator is reset by completion of the count of its associated counter, and when once actuated is not affected by subsequent clip pulses until it is reset. This means that the clip memory delay gate generator of the lowest number channel which is not busy will accept the next clip pulse from the *or* gate 104 of FIG. 4 and the result is that delayed clip pulses corresponding to the clip pulses from the *or* gate 104 are delivered, after after a time delay and in the same order they are received, to the knife response compensator 120 through the output 119.

Figure 7:
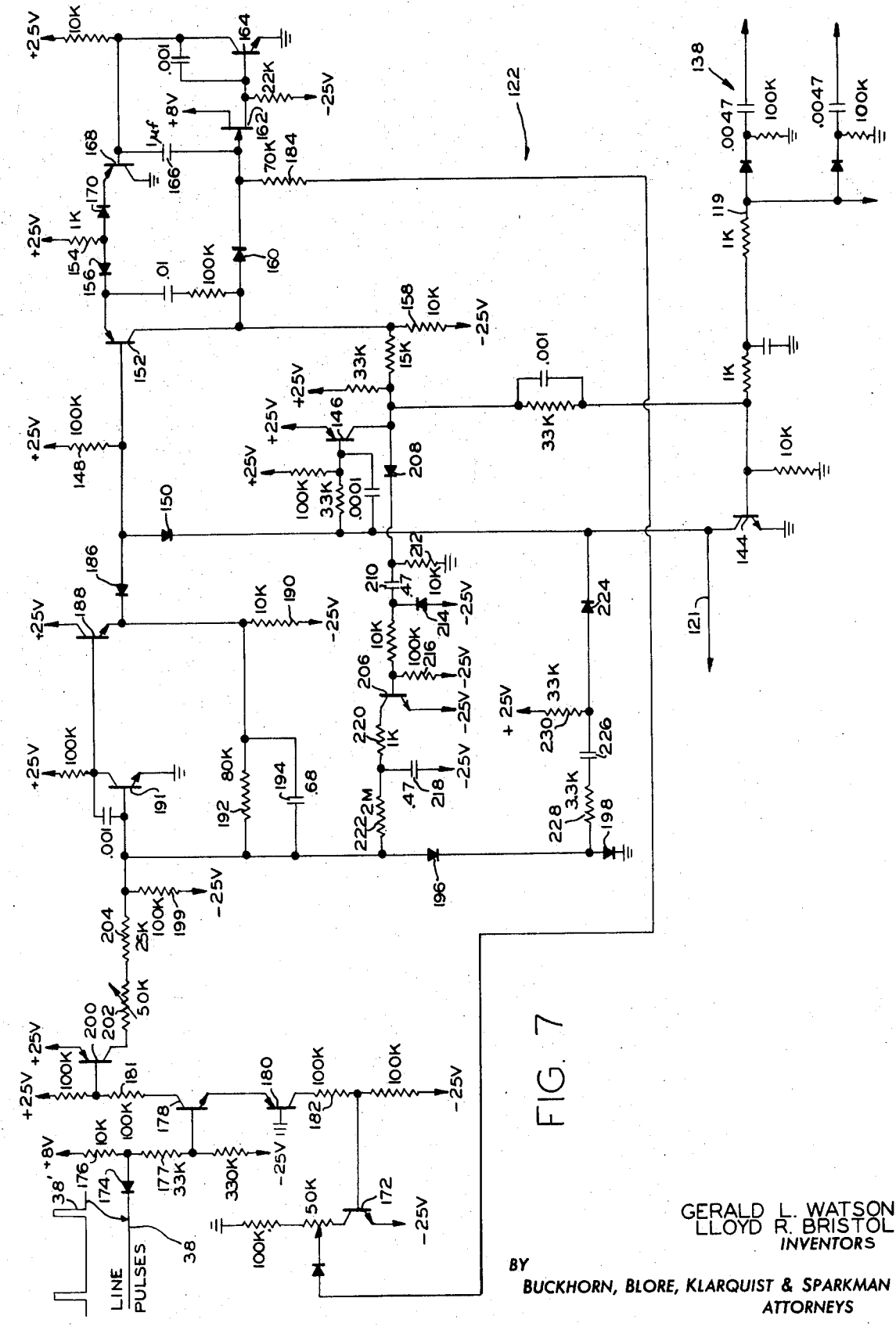
FIG. 7 is a schematic diagram of the circuits of the knife response compensator block of FIG. 4.

A schematic diagram of the circuit of the knife response compensator is shown in FIG. 7. Each delayed clip pulse passing through the *or* gate 138 is delivered through a resistor capacitor circuit, part of which is in the *or* gate 138, to the base of an NPN transistor 144 which is one of the transistors of a complementary type of bistable multivibrator also including a PNP transistor 146. Both transistors 144 and 146 are conducting when the multivibrator made up of these two transistors is in a first stable state. Under these conditions, current flow through a resistor 148 from a positive source of potential and through a diode 150 and the transistor 144 results in the collector of the transistor 144 and the portions of the circuit connected thereto being somewhat positive in potential but very close to ground potential. This means that the base of a PNP transistor 152 forming part of a comparator circuit is close to ground potential and that such transistor is conducting so that the emitter of the latter transistor, which is also connected to positive source of potential through resistor 154 and diode 156, is also close to ground potential. Resulting current flow through the emitter of transistor 152 and the resistor 158 causes the collector of transistor 152 to assume a sufficiently positive potential close to ground potential to render diode 160 conducting.

A field effect transistor 162 in conjunction with an NPN transistor 164 and the capacitor 166 form an operational amplifier of the Miller integrator type and the slight positive potential thus applied to the gate of the field effect transistor 162 through the diode 160 causes its source and the base of the transistor 164 to move slightly in a positive direction to cause the collector of transistor 164 to move in a negative direction so that the capacitor 166 is discharged and a PNP transistor 168 is rendered conducting as is also a diode 170.

The delayed clip pulse applied to the base of the transistor 144 from the *or* gate 138 is a negative going pulse which causes this transistor to cut off driving the potential of the collector of such transistor in a positive direction to thereby cut off the transistor 146. The potential of the collector of such transistor moves in a negative direction to hold the transistor 144 in its cut off condition.

Decreased current flow through the resistor 148 causes the potential on the base of the transistor 152 to become more positive to thus cut off this transistor which causes its collector to become negative and thus cut off diode 160 and conditioning the Miller integrator circuit including the transistors 162 and 164 and capacitor 166 for an integrating operation. The action of the Miller integrator holds the potential of the gate of the transistor 162 substantially constant and any current flow from the terminal of capacitor 166 connected to the gate of the transistor 163 to a negative source of potential, will cause the collector of transistor 164 to become proportionally more positive.

The Miller integrator circuit integrates current pulses derived from line pulses 38' from the line pulse shaper 36 of FIG. 3, such that the increase in positive potential on the collector of transistor 164 and the base of transistor 168 is proportional to the distance the strip being scanned moves during an integration operation of the Miller integrator. Current pulses corresponding to such line pulses are provided through an NPN transistor 172 shown near the left portion of FIG. 7. Thus positive line pulses 38' cause less current to be drawn through the diode 174 from a positive source through the resistor 176, thus causing intermediate points in the voltage divider including this resistor to move in a positive direction and apply a positive going pulse to the base of an NPN transistor 178. A positive voltage is applied to the collector of the transistor 178 and a negative voltage is applied to the collector of a PNP transistor 180 through resistors 181 and 182 from positive and negative sources, respectively. The emitters of the transistors 178 and 180 are connected together and the base of the transistor 180 is connected to ground. The potential on the base of the transistor 178 in the absence of a positive going line pulse is such that both transistors 178 and 180 are cut off. At this time transistor 172 is also cut off.

A positive going voltage supplied to the base of transistor 178 as the result of a line pulse 38′ being delivered to the circuit just described, turns on transistors 178, 180 and 172 to cause the collector of transistor 172 to be driven in negative direction, thus providing for current flow through the resistor 184 to a negative source of potential from the capacitor 166 of the Miller integrator circuit described above. The output of the Miller integrator circuit at the collector of the transistor 164 and base of the transistor 168 is thus a positive going stairstep voltage in which each step represents an increase in voltage corresponding to one increment of movement, for example, approximately 1/10 of an inch movement of the strip being scanned. At this time transistor 168 is conducting and the positive increments of voltage applied to its base causes its emitter to correspondingly assume a more positive voltage in corresponding steps. Such voltage steps are also applied to the emitter of the transistor 152, which at this time is cut off.

Since the multivibrator transistor is at this time cut off, the positive voltage applied to the base of transistor 152 is determined by a circuit including the resistor 148, a diode 186 and an NPN transistor 188 having its collector connected to a positive source of potential and its emitter connected through a resistor 190 to a negative source of potential. Except for a small voltage drop across the diode 186, the voltage applied to the base of the transistor 152 is the same as the voltage of the emitter of the transistor 188.

Transistor 188 in conjunction with another NPN transitor 191, a resistor 192 and a capacitor 194 provide another operational amplifier, such that the emitter voltage of transistor 188 is dependent at any time upon the amount of charge upon the capacitor 194, i.e. the voltage existing between the terminals of such capicitor. The action of this operational amplifier maintains the potential applied to the base of the transistor 191 substantially constant and close to ground potential and any current flow to a negative source from the capacitor 194 through its terminal connected to such base will cause the emitter of the transistor 188 to move in a positive direction and conversely any current flow through such terminal into the capacitor 68 from a positive source of potential will cause the output voltage at the colector of the transistor 188 to move in a negative direction. The resistor 192 connected in shunt with the capacitor 194 provides a continuously operating discharge path for the capacitor 194. Since the base of the transistor 191 is not driven in a positive direction substantially above ground potential, diodes 196 and 198 connected between this base and ground do not interfere with such action of the operational amplifier just described. These diodes form part of other circuits described below.

In the absence of other current feeds, discussed below, to the terminals of capacitor 194 connected to the base of transistor 191, which current feeds are functions of the rate of travel of the strip 12 being fed to the knife 14 of FIGS. 1 and 2 and of the time since the last clipping operation of the knife, the rate of current flow from such terminal of the capacitor 194 to a negative source of potential through the resistor 199 causes the potential on the collector of transistor 188 to be driven in positive direction. This is similar to the operation of a Miller integrator except that the discharge path of the capacitor 194 through the resistor 192 converts the circuit into one which is responsive to a rate of current flow rather than to the integral of current flow.

The result is that under the conditions just described the emitter of the transistor 188 and therefor the potential applied to the base of the transistor 152 approaches but does not reach the potential of the positive source to which the resistor 148 and the collector of the transistor 188 are connected. As further discussed below, this is the condition when the veneer strip 12 being fed to the knife 14 is moving very slowly. Under this condition, the multivibrator including the transistors 144 and 146 will not be reverted and a delayed clip pulse from the output 119 of the clip memory delay counter 106 will not result in a knife actuating pulse being sent to the knife valves driver until the integrated voltage at the base of transistor 168 becomes more positive than the positive potential on the base of the transistor 152. Thus any knife actuating pulse sent to the knife valves driver from the knife response compensator 120 is further delayed. This delay will last for an indefinite time if the veneer is stopped during the integrating operation of the multivibrator including the transistors 162 and 164, and the knife will not be operated until the strip again starts moving.

The voltage applied to the base of the transistor 152 during an integration of current pulses corresponding to line pulses by the circuit including the transistors 162 and 164 is in part controlled by the rate of movement of the strip 12 toward the knife 14. The circuit inluding a PNP transistor 200, a variable resistor 202 and a resistor 204 provides a path of current from a positive source of potential to the capacitor 194 when transistor 200, which is normally cut off, is turned on. This transistor 200 is turned on for the width of any line pulse 38′ supplied to the circuit including the transistor 178 from the output 38 of the line pulse shaper 36. As discussed above this turns on the normally cut off transistor 178 which causes the collector of such transistor to be driven in a negative direction and a portion of such negative going voltage is applied to the base of the PNP transistor 200. This turns on the transistor 200 to supply current to the capacitor 194 from the positive source of potential to which the collector of the transistor 200 is connected.

As described above, the current supply from the negative source through the resistor 199 tends to hold the output voltage at the emitter of the transistor 188 at a positive potential, for example, approximately 20 volts. Any current feed to the capacitor 194 from a positive source through the transistor 200 to charge such capacitor causes the output voltage at the emitter of the transistor 188 to move in a negative direction. The resulting less positive voltage at such emitter depends upon the rate at which positive line pulses reach the junction between the resistors 176 and 177, since the capacitor 194 is also continuously discharging through the resistor 192. The voltage supplied to the base of the transistor 152 thus in part depends upon the rate of movement of the veneer strip being scanned. For a zero rate of movement of the veneer strip, this voltage approaches that of the positive voltage source of the collector of the transistor 188 as described above, and becomes less positive as the rate of movement of the strip becomes greater.

The voltage at the emitter of the transistor 188 is also in part controlled by circuits which vary the charge on the capacitor 194 as a function of the time since the last clipping operation of the knife 14 in order to compensate for a variable delay caused by the knife not having returned to a normal position of rest since such last clipping operation. Thus a delayed clip pulse from the clip memory delay counter 106 can be received by the knife response compensator before the knife has returned to one of its positions of rest, for example, the position shown in FIG. 2, and this can result in a knife actuating pulse being sent to the knife valves driver 122 before the knife 14 of FIG. 2 has returned to such rest position. Under these conditions the delay which would be produced by the knife response compensator before sending a knife actuating pulse on to the knife valves driver is increased, since it takes less time for the knife to make a clip after such pulse has been received, if the knife has not returned completely to its rest position.

The increase in delay just discussed is not a straight line function of the time since the last clipping operation by the knife but is a modified exponential function. Two circuits are employed for causing current flow from the terminal of the capacitor 194 connected to the base of transistor 191 in accordance with such modified function.

One of the current control circuits includes an NPN transistor 206 which is normally cut off so that such circuit does not affect the charge on the capacitor 194. When reversion of the multivibrator including the transistors 144 and 146 back to its first steady state causes knife response compensator to send a knife actuating pulse to the knife valves driver 122 resulting in a clipping operation of the knife 14, the collector of the transistor 146 is driven in a positive direction to substantially the potential of the positive voltage supply connected to the emitter of such transistor. This positive going potential is applied through a diode 208 to one terminal of a capacitor 210, which terminal is normally at ground potential at that time because of a resistor 212 connected between such terminal and ground. The other terminal of the capacitor 210 will normally be at substantially the potential of the negative source to which the diode 214 and resistor 216 are connected.

The positive going voltage from the collector of the transistor 146 is transmitted through the capacitor 210 to the base of the transistor 206 to turn this transistor on, which results in rapidly changing the charge on a capacitor 218 by current flow through a resistor 220. The capacitor 218 has one terminal connected between the resistor 220 and another resistor 222 and its other terminal connected to a negative source of potential, the other end of the resistor 222 being connected to the base of the transistor 191 and thus to one terminal of the capacitor 194. The terminal of the capacitor 218 connected to the resistor 222 is thus driven in a negative direction from substantially the potential upon the base of the transistor 191. The charged capacitor 218 thus becomes a negative source of potential to which current flows from the capacitor 194 through the resistor 222 to effect a change in the charge on the capacitor 194 and then an exponential decay of this change in charge. This results in the emitter of the transistor 188 being driven in a positive direction in opposition to the action of the line pulses, discussed above, operating through the transistors 178 and 200. The potential of the emitter of transistor 188 then gradually returns to the voltage resulting from the action of such line pulses. The capacitor 210 discharges through the resistor 212 and diode 214 such that the resulting potential applied to the base of the transistor 206 again turns off this transistor.

A more rapidly operating circuit which also results in driving the emitter of the transistor 188 in a positive direction for a short length of time is connected between the collector of the transistor 144 and the base of the transistor 191 through a capacitor 226 and the diode 196. This circuit includes a diode 224, the capacitor 226 and a resistor 228 in series as well as a resistor 230 having one terminal connected to a point between the diode 224 and the capacitor 226 and its other terminal connected to a source of positive potential.

When the multivibrator including the transistors 144 and 146 reverts so as to send a knife actuating pulse to the knife valves driver, the collector of the transistor 144 is driven in a negative direction to substantially ground potential. Since the terminal between the diode 224 and the capacitor 226 was just prior to this time held at a positive voltage by reason of the connection of the resistor 230 to a positive source of potential, the negative step of voltage produced at the collector of the transistor 144 is applied to the capacitor 226 to change the charge on this capacitor and the capacitor 194 in series therewith through the resistor 228 and diode 196. The diode 198 provides a charging path for capacitor 226. The changing of the charge on the capacitor 194 causes the emitter of the transistor 188 to be driven in a positive direction also in opposition to the effect of the line pulse 38 supplied through the transistor 200 and this positive going potential also exponentially decays at a more rapid rate than that due to the circuit including the transistor 206 to thus produce the modified exponential function referred to above.

The result of the operation of the circuit just described is that the voltage on the emitter of the transistor 188 and therefor the base of the transistor 152 depends upon the rate at which line pulses are produced, i.e., the rate of movement of the strip being scanned, and also upon the time since the last clipping operation of the knife. The time constants of the circuits described above are of importance and in a particular example the time constant of the circuit including the capacitor 194 and resistor 192 was approximately .04 second, the time constant of the circuit including the capacitor 218 and resistor 222 was approximately .94 second, and the time constant of the circuit including the capacitor 226 and resistor 228 was approximately .0022 second.

As stated above, the circuit including the transistors 162 and 164 integrates current pulses corresponding to the line pulses 38' and produces a positively going stairstep voltage. This stairstep voltage is applied to the emitter of the transistor 152 through the transistor 168. When the voltage on the emitter of the transistor 152 exceeds the voltage on the base of such transistor, the transistor 152 is turned on such that the collector of this transistor is driven in a positive direction and a portion of the positive going voltage on such collector is applied to the base of the transistor 144 to turn such transistor on and thus cause reversion of the multivibrator also including the transistor 146. The result is the sending of a negative going pulse through the output connection 121 to the knife valves driver from the collector of the transistor 144.

Since the greater the rate of production of line pulses 38', the less positive the voltage at the base of the transistor 152, i.e., the greater the rate of travel of the strip being scanned at the time the knife response compensator 120 is ready to send an actuating pulse to the knife valves driver 122, the sooner the stairstep voltage being generated in the circuit including the transistors 162 and 164 reaches the voltage on the base of the transistor 152 and the less the delay in sending a knife actuating pulse to the valves driver 122. On the other hand the shorter the length of time since the last clipping operation, the more positive the potential applied to the base of the transistor 152 and the longer the delay provided by the knife response compensator before sending an actuating pulse to the knife valves driver. The time constant of the circuits described above can thus be selected to compensate for variations in rate of movement of the strip toward the knife and also the time since the last clipping operation of the knife so that a much more accurate clipping operation can be accomplished. It is to be noted that the corrections referred to are determined at a time which is very close to the time which the knife actually operates.

The knife valves driver 122 indicated in FIG. 4 may be any known or suitable circuit which will accept negative going pulses from the output 121 of the knife response compensator and then supply electric power to solenoid operated valves 232 and 234 for controlling the supply of air under pressure to the cylinders 18 and 20 of the knife actuating mechanism of FIG. 16. In the valve arrangement shown in FIG. 2, the valves 232 and 234 are four way valves and successive pulses from the knife response compensator 170 will cause the knife valves driver 122 to alternately energize the solenoids of valves 232 and 234 through outputs 236 and 238, respectively.

Receipt of one such pulse by the knife valves driver 122 will cause energization of the solenoid of valve 232 through the output 236 and removal of energization of the solenoid of valve 234 through output 238. This will connect the right ends of cylinders 18 and 20 to a source of air under pressure and at the same time connect the left ends of these cylinders to the atmosphere with resultant movement of the centers of the toggles 16 to the right from the position of rest shown to produce a cutting operation of the knife 14. The knife and toggles will then continue movement to a second position of rest. The next pulse will cause energization of the solenoid of valve 234 through the output 238 and removal of energization of the valve 232 through the output 236 to cause reverse movement of the centers of the toggles 16 to the left and another clipping operation of the knife.

The video amplifier 44 of FIG. 3 may be any type of known or suitable video linear amplifier and its circuit is therefor not shown in detail. The circuit of the illumination regulator is, however, shown in FIG. 5 and in this figure the output 45 of the video amplifier is delivered to an integrating circuit including a capacitor 240 and resistor 242 connected in parallel between ground and the base of a transistor 244, the output of the video amplifier being connected to the capacitor 240 and resistor 242 through a diode 246 so that positive going voltages will charge the capacitor 240 but discharge of the capacitor 240 is through the resistor 242. The time constant of the integrating or storage circuit is made quite large, for example approximately 1.6 seconds, so that the voltage applied to the base of the transistor 244 remains approximately that of the maximum output voltage of the amplifier 44, i.e. the output when light colored good wood is being scanned.

The transistor 244 forms part of a paraphase amplifier also including the transistor 248 whose base is maintained at a predetermined positive voltage with respect to ground by a voltage divider made up of resistors 250 and 252 connected between sources of positive potential of different voltage. The potential at which the base of transistor 248 is thus held corresponds to the desired maximum video signal from the video amplifier 44.

In the absence of an enabling voltage through an output 253 from an *and* gate 254 of FIG. 3, the potential at the collectors of the transistors 244 and 248 of FIG. 5 are at a sufficiently positive potential with respect to ground that the transistors 255 and 256, having their bases connected to the collectors of the transistors 244 and 248, respectively, are conducting to the extent that the transistors 258 and 260, having their bases connected to the collectors of the transistors 255 and 256, respectively, are cut off. Under these conditions the amplifier circuit including the transistors 244 and 248 has no control over the transistors 258 and 260.

Control of the transistors 258 and 260 by the circuit including the transistors 244 and 248 is established when a positive voltage is supplied to the *and* gate 254 of FIG. 3 from the width gate generator 58 as a result of the optical scanner 26 encountering good wood during a scan, and at the same time a positive voltage is supplied to the *and* gate 254 from the clip mode alternator as the result of this alternator being in the trailing edge mode. These two positive voltages cause a positive enabling voltage to be delivered from the *and* gate 254 and through its output 253 to the illumination regulator 46. The result is that the illumination regulator 46 is controlled by the output of the video amplifier only when the optical scanner is scanning good wood in an acceptable portion of the strip.

Upon receipt of the positive voltage through the output 253 of the and gate 254 of FIG. 3, a portion of this positive voltage is applied to the base of the transistor 262 of FIG. 5 through the voltage divider including the resistors 264, 266 and 268 connected between a positive and negative source of potential. The transistor 262 is cut off in the absence of this positive voltage and is turned on by such positive voltage. That is to say, the voltage from the width gate generator, when it is not generating a gate voltage, or from the clip mode generator, when it is not in the trailing edge mode, is such that the terminal between the resistors 264 and 268 of FIG. 5 is held sufficiently close to ground potential that the voltage at the terminal between the resistors 266 and 268 causes cutting off of the transistor 262.

Turning on of the transistor 262 applies a negative going voltage from its collector to the base of the transistor 270 to turn this transistor off from a normally conducting state and this causes the transistor 270 to apply a positive going voltage to the normally turned on transistor 272 to also turn this transistor off. The turning off of transistor 272 effectively removes the positive potential referred to above from the collectors of the transistors 244 and 248 and the bases of the transistors 254 and 256 since this positive voltage was supplied by the conduction of the transistor 272. The result is to establish control of the conductivity of transistors 258, 260 by the transistors 244 and 248, respectively, through transistors 255 and 256.

When the voltage applied to the base of transistor 244 equals that applied to the base of transistor 248, both of these transistors are conducting as are transistors 255 and 256 but transistors 258 and 260 are cut off.

The impedance of the circuit including the bridge rectifier 273 and the transistor 258 connected in series with the transformer winding 274, and therefore the effective impedance to alternating current of the transformer winding 276 depends upon the conductivity of transistor 258. Similarly the impedance of the circuit including the bridge rectifier 277 and the transistor 260 connected in series with the transformer winding 278, and therefore the effective alternating current impedance of the transformer winding 280, depends upon the conductivity of the transistor 260.

The motor 290 is a conventional type of reversible, single phase alternating current motor which will run in one direction when one of its stator windings 291 is energized by decrease of the impedance of transformer winding 276 when the transistor 258 is rendered conducting, and in the other direction when the other of its windings is energized by a similar decrease of impedance of the transformer winding 280. When the voltage applied to the base of the transistor 244 from the circuit including the capacitor 294 and resistor 296 become more positive than the constant voltage applied to the base of the transistor 248, the transistor 244 becomes less conductive so as to apply a more negative voltage to the base of the transistor 256 to turn on this transistor. This reduces the effective impedance of the transformer winding 280 to cause the motor 290 to turn in one direction. Similarly, when voltage applied to the base of the transistor 244 becomes less positive than the constant voltage applied to the base of the transistor 248, the motor 290 will turn in the opposite direction.

The motor 290 can be employed to drive a voltage adjusting shaft of any known or suitable variable source of power, such as the shaft of an adjustable auto transformer (not shown) so as to increase the power supplied to the lamps 22 of FIGS. 1 and 2 when the maximum voltage from the video amplifier during scanning operations of acceptable good wood decreases below a predetermined value and vice versa, so as to maintain the maximum reflected light from the good wood of the strip being scanned substantially constant even though the ambient illumination or the reflectivity of the good wood changes.

FIG. 5 also includes the circuit of the reference level generator 48 of FIG. 3 and also the circuit of the comparator which forms a part of the comparator and signal shaper 50 and which determines whether the output of the video amplifier is above or below the reference level set by generator 48.

In FIG. 5 the output 45 from the video amplifier 44 of FIG. 3 is also delivered through a diode 292 to a capacitor 294 and resistor 296 connected in parallel between the base of a transistor 298 and ground. The capacitor 294 and resistor 296 make up an integrator and storage circuit of the same type as the capacitors 240 and 242 of the illumination regulator 46. The maximum video output voltage resulting from scanning of good wood is maintained on the terminal of the capacitor 294 connected to the base of the transistor 298. The transistor 298 has a potentiometer 300 in its emitter circuit and this potentiometer will ordinarily be set so that a voltage which is approximately one-half of that applied to the base of the transistor 298 is delivered as a reference voltage to the base of a transistor 302 forming part of a comparator and gating circuit also including a transistor 304 having its base connected to the output 45 of the video amplifier 44. This circuit also includes diodes 306 and 308 connected back to back and having their common terminal connected to the collector of a transistor 310. The transistor 310 is connected to operate as constant current device to supply current from source of positive potential to the common terminal of diodes 306 and 308. The sweep gate waveform 32 of FIG. 3 is also delivered through another diode 320 and a resistor 322 to such terminal. Between sweeps of the scanner, i.e. when the strip is not being scanned, this sweep gate is substantially at ground potential and cuts off the diodes 306 and 308 so that the transistors 309 and 304 are cut off and the potential of collector of the transistor 302 is driven in a negative direction.

During a sweep, the sweep gate voltage is positive and the comparator circuit including the transistors 304 and 302 is rendered operative. Whenever the voltage from the video amplifier applied to the base of the transistor 304 is more positive than the reference voltage applied from emitter of the transistor 298 through the potentiometer 300 to the base of the transistor 302, i.e. when the scanner 26 is scanning good wood, the voltage on the emitter of the transistor 304, and therefore on the emitter of the transistor 303 are driven sufficiently positive to turn on transistor 302 and drive its collector in a positive direction.

If the voltage applied from the optical scanner 26 to the base of the transistor 304 becomes less than approximately half of the voltage on the capacitor 294, the voltage on the emitter of the transistor 304 is driven in a negative direction so as to cause the voltage on emitter of the transistor 302 to be below the voltage applied to the base of such transistor so as to cut such transistor off and drive the collector in a negative direction. This varying output from the comparator circuit just described is delivered to a signal shaper 324 which, for example, may be a circuit of a Schmitt trigger type, which is in one stable state when the voltage delivered thereto is above a predetermined voltage and is in its other state when the voltage applied to the circuit is below another predetermined voltage somewhat below the first predetermined voltage so that the output 52 of the signal shaper, which is the output of the comparator and signal shaper 50 of FIG. 3, is a series of positive rectangular pulses having widths proportional to the width of good wood along a line scan.

The voltage applied to the base of the transistor 298 from the capacitor 294 for establishing a reference voltage for the comparator circuit including the transistor 302 is maintained substantially that of the maximum output voltage of the video amplifier 44 of FIG. 3 when good wood is being scanned. This is accomplished by making the time constant of the circuit including the capacitor 249 and the parallel circuit including the resistor 296 and the base circuit of the transistor 298 relatively low when good wood is being scanned during a scanning operation and relatively high at other times. A circuit including a transistor 326 is provided for this purpose.

The transistor 326 is normally cut off but when good wood is being scanned, the voltage from the collector of the transistor 302 applied to the base of the transistor 326 is sufficiently positive to turn on the transisor 326 and reduce the voltage at the emitter of the transistor 298 to a low positive value from a relative higher positive voltage to reduce the emitter collector voltage of such transistor to a low value. This has little effect on the emitter current or emitter voltage of the transistor 298 for a given voltage applied to the base of this transistor but because of the low value of collector-emitter voltage, the base current of the transistor is relatively large as compared to a condition when the emitter-collector voltage is greater. This large base current means that the effective direct current resistance of the base circuit of the transistor 298 is relatively low and that the time constant of the resistance-capacitance circuit including the capacitor 294 is relatively low.

When good wood is not being scanned the voltage supplied from the collector of the transistor 302 to the base of the transistor 326 is sufficiently negative to cut off this transistor. The voltage on the collector of transistor 298 becomes more positive to increase the collector-emitter voltage. This causes the base current of this transistor to become relatively low so as to increase the effective resistance of the base circuit and thus the time constant of the circuit including the capacitor 294.

The voltage at the terminal of the capacitor 294 connected to the base of the transistor 298 thus rapidly assumes the value of the voltage from the video amplifier when good wood is being scanned, and such voltage is maintained for a substantial time when good wood is not being scanned. This voltage is employed in producing an output signal 51 from the signal shaper 324 which enables the presence or absence of good wood during a line scan to be accurately determined. Such determinations are then employed to accurately determine the presence or absence of flaws in the veneer strip 12 of FIG. 1 being fed to the knife 14 so as to enable the knife to be controlled to cut flaws from the strip to leave a maximum amount of good wood in the form of usable panels.

We claim:

1. A system for determining whether portions of moving material are acceptable or unacceptable depending upon the optical properties of such material which comprises:

scanning means for making optical scans along spaced lines across said material and producing an output signal at an output signal level which varies with respect to a reference signal level in accordance with the light received from said material by said scanning means;

means for producing clock pulses at a substantially uniform rate;

first counter means controlled by said output signal for counting said clock pulses during the time in each of said scans in which said output signal departs from said reference signal level in one direction, said counter means including means for producing a flaw indication signal when the count of said first counter means exceeds a predetermined count;

second counter means controlled by said output signal for counting said clock pulses during any period in a scan in which said output signal level departs from said reference signal level in the other direction and which occurs after a count by said first counter means has been initiated during such scan, said second counter means including means for producing a flaw indication signal each time a count of said second counter means exceeds a predetermined count;

means for producing a single output flaw indication signal at the end of any one scan whenever a flaw indication signal is produced by either of said counter means during said one scan;

and means responsive to the production of a plurality of output flaw indication signals exceeding a predetermined number of said output flaw indication signals during a predetermined number of successive scans for determining whether the portions of said material thus scanned are acceptable or unacceptable.

2. A system in accordance with claim 1 which also includes:
means for illuminating said material;
and means responsive to the maximum output signal level of said scanning means in said one direction for controlling said illumination means to maintain said maximum output signal level substantially constant under conditions of varying ambient illumination.

3. A system in accordance with claim 1 which also includes means responsive to the maximum output signal level of said scanning means in said one direction for establishing said reference signal level at a predetermined value proportional to and less than said maximum output signal level.

4. A system in accordance with claim 1 in which said material being scanned is a moving strip of material and in which:
said first counter means is a strip width counter means controlled by said output signal to initiate a count of said clock pulses by said strip width counter means in any of said scans when said output signal level first exceeds said reference signal level;
and said second counter means is a flaw width counter means controlled by said output signal for counting clock pulses during periods in said scans when said output signal level thereafter becomes less than said reference signal level.

5. A system in accordance with claim 4 which also includes means for enabling operation of said flaw width counter only during the operation of said strip width counter.

6. A system in accordance with claim 1 in which the material being scanned is a strip of veneer being moved to a veneer clipper knife and in which:
said scanning means produces an output signal level which exceeds said reference signal level in each of said scans when said scanning means is scanning light colored acceptable good wood and which is less than said reference level when said scanning means is not scanning said good wood;
and in which said system includes means for producing a flaw indication signal when an acceptable width of good wood free of flaws of unacceptable width is not scanned by the scanning means during any one scan.

7. A system in accordance with claim 4 which also includes:
means for producing line pulses at a rate proportional to the rate of movement of said strip;
and means causing the initiation of one of said scans by each of said line pulses;
said means responsive to the production of a plurality of output flaw indication signals including;
means for producing a single flaw pulse corresponding to each scan in which at least one of said flaw indication signals is produced;
flaw length counter means for counting flaw pulses;
line pulse counter means for counting line pulses;
and control means responsive to predetermined counts of said flaw length counter means and said line pulse counter means for determining the presence or absence of a flaw of unacceptable length in said strip.

References Cited
UNITED STATES PATENTS

| | | | |
|---|---|---|---|
| 2,674,915 | 4/1954 | Anderson | 88—14 |
| 2,866,376 | 12/1958 | Cook | 250—219X |
| 3,019,346 | 1/1962 | Laycak | 250—219 |
| 3,020,034 | 2/1962 | Laycak et al. | 266—23 |
| 3,096,443 | 7/1963 | Laycak | 356—200 |
| 3,120,861 | 2/1964 | Finlay et al. | 144—2 |
| 3,280,692 | 10/1966 | Milnes et al. | 356—200X |
| 3,407,268 | 10/1968 | Sennhenn | 178—7.2D |

ROBERT L. GRIFFIN, Primary Examiner

R. K. ECKERT, JR., Assistant Examiner

U.S. Cl. X.R.

83—72, 371; 178—6; 250—219; 356—237

PO-1050
(5/69)

UNITED STATES PATENT OFFICE
CERTIFICATE OF CORRECTION

Patent No. 3,560,096        Dated February 2, 1971

Inventor(s) Gerald L. Watson and Lloyd R. Bristol

It is certified that error appears in the above-identified patent and that said Letters Patent are hereby corrected as shown below:

Column 2, line 39, "a" should be --in--. Column 3, line 24, "take" should be --tube--. Column 3, line 67, "from the ref ence level" (second occurrence) should be canceled. Column line 70, "ref-er-" should be --refer- --. Column 5, line 6, "and" (italics) should be --an--. Same line, "and" should b --and-- (italics). Column 6, line 62, after "second" inser --stable--. Column 7, line 50, "ben" should be --been--. Column 9, line 73, cancel "after" (second occurrence). Colu 11, line 46, "colector" should be --collector--. Column 15, line 63, "and" should be --and-- (italics).

Signed and sealed this 8th day of June 1971.

(SEAL)
Attest:

EDWARD M. FLETCHER, JR.        WILLIAM E. SCHUYLER,
Attesting Officer        Commissioner of Paten